US012676773B2

(12) United States Patent
Sweeney et al.

(10) Patent No.: US 12,676,773 B2
(45) Date of Patent: Jul. 7, 2026

(54) MANAGING ACCESS TO PRIVATE NETWORK RESOURCES FROM EXTERNAL DEVICES VIA A RELAY COMPUTING ELEMENT

(71) Applicant: Tailscale Inc., Toronto (CA)

(72) Inventors: Shayne M. Sweeney, Fairfield, CT (US); Bradley J. Fitzpatrick, Seattle, WA (US); Maisem J. Ali, Woodinville, WA (US)

(73) Assignee: Tailscale Inc., Toronto (CA)

( * ) Notice: Subject to any disclaimer, the term of this patent is extended or adjusted under 35 U.S.C. 154(b) by 72 days.

(21) Appl. No.: 18/897,499

(22) Filed: Sep. 26, 2024

(65) Prior Publication Data

US 2025/0168039 A1 May 22, 2025

Related U.S. Application Data

(60) Provisional application No. 63/600,209, filed on Nov. 17, 2023.

(51) Int. Cl.
*H04L 12/46* (2006.01)
*H04L 9/40* (2022.01)

(52) U.S. Cl.
CPC ...... *H04L 12/4633* (2013.01); *H04L 12/4641* (2013.01); *H04L 63/0272* (2013.01); *H04L 63/10* (2013.01)

(58) Field of Classification Search
CPC ............. H04L 12/4633; H04L 12/4641; H04L 63/0272; H04L 63/10; H04L 63/0281
See application file for complete search history.

(56) References Cited

U.S. PATENT DOCUMENTS

| | | | | |
|---|---|---|---|---|
| 7,606,191 B1 * | 10/2009 | Breau | ................. | H04L 12/4641 370/328 |
| 8,635,441 B2 * | 1/2014 | Frenkel | ................... | G06F 21/50 713/153 |
| 10,771,436 B2 * | 9/2020 | Taylor | ................. | H04L 63/0245 |
| 2002/0124090 A1 * | 9/2002 | Poier | .................... | H04L 63/061 709/228 |
| 2002/0186693 A1 * | 12/2002 | Inoue | .................. | H04L 61/5014 370/352 |
| 2004/0249974 A1 * | 12/2004 | Alkhatib | ............. | H04L 61/2503 709/245 |
| 2009/0113203 A1 * | 4/2009 | Tsuge | .................... | H04L 61/256 713/151 |
| 2011/0047612 A1 * | 2/2011 | D'ambrosio | .......... | H04W 12/08 726/12 |
| 2013/0103834 A1 * | 4/2013 | Dzerve | ................... | H04L 67/10 709/225 |

(Continued)

*Primary Examiner* — Muhammad Raza

(57) ABSTRACT

Described herein are systems, methods, and software that manage the communication between computing elements outside a private network and computing elements inside a private network. In one example, a relay computing element receives a first packet from a first computer outside a private network. The relay computing element determines whether the first packet is permitted for a second computer inside the private network. If the first packet is permitted, the relay computing element generates a second packet with the first packet in the payload and encapsulates the second packet in a third packet. Once encapsulated, the third packet is forwarded to the second computer.

13 Claims, 6 Drawing Sheets

200

RECEIVE A FIRST PACKET FROM A FIRST COMPUTING ELEMENT OUTSIDE OF A PRIVATE NETWORK ~201

DETERMINE WHETHER A SECOND COMPUTING ELEMENT IN THE PRIVATE NETWORK PERMITS RECEIPT OF THE FIRST PACKET BY PROVIDING PACKET INFORMATION TO THE SECOND COMPUTING ELEMENT ~202

WHEN AVAILABLE, GENERATE A SECOND PACKET WITH THE FIRST PACKET IN A PAYLOAD OF THE SECOND PACKET AND PRIVATE IP ADDRESSING ASSOCIATED WITH THE RELAY AND SECOND COMPUTING ELEMENT IN A HEADER OF THE SECOND PACKET ~203

ENCAPSULATE THE SECOND PACKET IN A THIRD PACKET, WHEREIN THE THIRD PACKET COMPRISES PUBLIC ADDRESSING INFORMATION ~204

COMMUNICATE THE THIRD PACKET TOWARD THE SECOND COMPUTING ELEMENT ~205

(56) References Cited

U.S. PATENT DOCUMENTS

| | | | | |
|---|---|---|---|---|
| 2016/0080502 A1* | 3/2016 | Yadav | .................. | H04L 47/825 |
| | | | | 709/227 |
| 2016/0219024 A1* | 7/2016 | Verzun | ..................... | H04L 9/34 |
| 2017/0034129 A1* | 2/2017 | Sawant | .............. | H04L 12/4633 |
| 2019/0222552 A1* | 7/2019 | Xiao | .................. | H04L 61/2535 |
| 2020/0186501 A1* | 6/2020 | Neystadt | ................ | H04L 63/08 |
| 2020/0412576 A1* | 12/2020 | Kondapavuluru | .. | H04L 63/0435 |
| 2022/0029973 A1* | 1/2022 | Carney | .............. | H04L 61/5007 |
| 2022/0239679 A1* | 7/2022 | Sircar | .............. | G06F 18/23213 |
| 2022/0255905 A1* | 8/2022 | Carney | .............. | H04L 63/0263 |
| 2022/0360566 A1* | 11/2022 | Sawant | ................ | H04L 63/061 |
| 2023/0164119 A1* | 5/2023 | Kasslin | .............. | H04L 63/0272 |
| | | | | 726/12 |

* cited by examiner

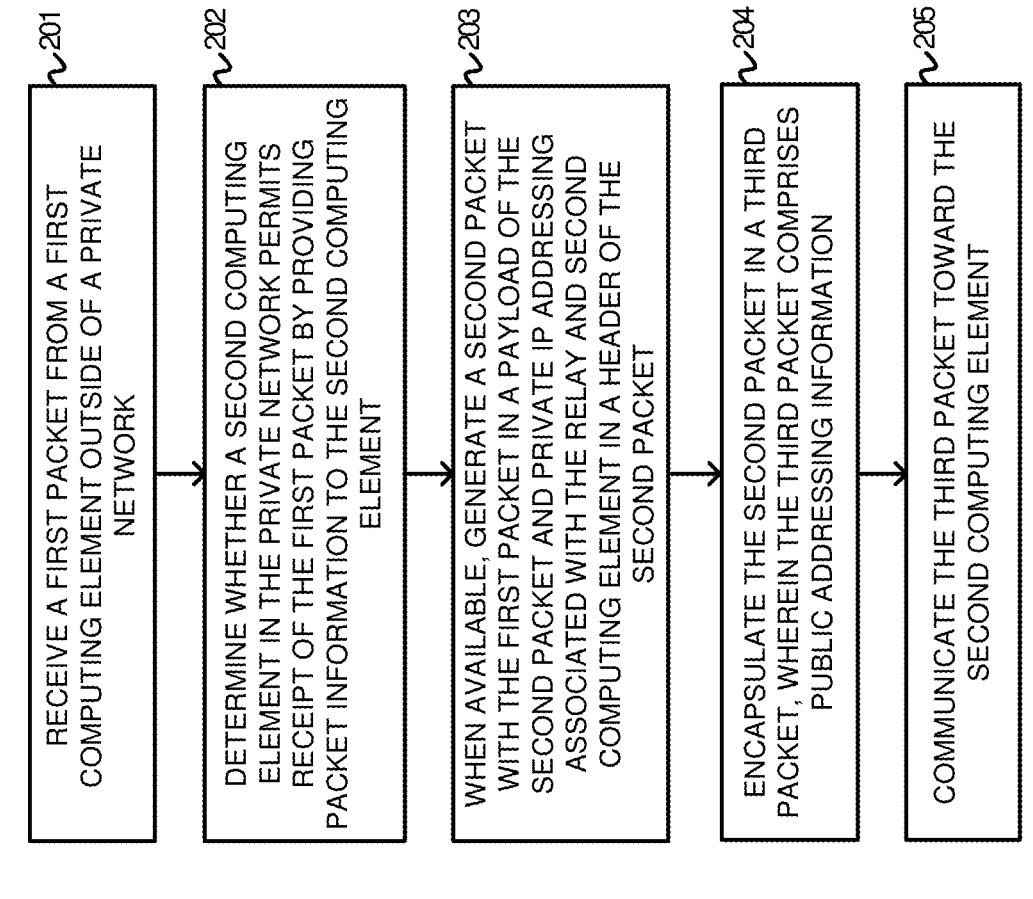

201

RECEIVE A FIRST PACKET FROM A FIRST COMPUTING ELEMENT OUTSIDE OF A PRIVATE NETWORK

202

DETERMINE WHETHER A SECOND COMPUTING ELEMENT IN THE PRIVATE NETWORK PERMITS RECEIPT OF THE FIRST PACKET BY PROVIDING PACKET INFORMATION TO THE SECOND COMPUTING ELEMENT

203

WHEN AVAILABLE, GENERATE A SECOND PACKET WITH THE FIRST PACKET IN A PAYLOAD OF THE SECOND PACKET AND PRIVATE IP ADDRESSING ASSOCIATED WITH THE RELAY AND SECOND COMPUTING ELEMENT IN A HEADER OF THE SECOND PACKET

204

ENCAPSULATE THE SECOND PACKET IN A THIRD PACKET, WHEREIN THE THIRD PACKET COMPRISES PUBLIC ADDRESSING INFORMATION

205

COMMUNICATE THE THIRD PACKET TOWARD THE SECOND COMPUTING ELEMENT

MANAGING ACCESS TO PRIVATE NETWORK RESOURCES FROM EXTERNAL DEVICES VIA A RELAY COMPUTING ELEMENT

RELATED APPLICATIONS

This application is related to and claims priority to U.S. Provisional Patent Application 63/600,209, titled "MANAGING ACCESS TO PRIVATE NETWORK RESOURCES FROM EXTERNAL DEVICES VIA A RELAY COMPUTING ELEMENT," filed Nov. 17, 2023, and which is hereby incorporated by reference in its entirety.

TECHNICAL BACKGROUND

A private network is a restricted and secure communication infrastructure that is typically confined within a specific organization or a defined group of users. In contrast to public networks like the Internet, private networks are designed to be exclusive, allowing authorized users and devices to exchange data within a controlled and protected environment. These networks often use various security measures, such as firewalls, encryption, and access controls, to safeguard the integrity and confidentiality of the transmitted information.

Private networks are commonly employed by businesses, government entities, and other organizations to facilitate internal communication, data sharing, and resource access among employees or members. By establishing a private network, organizations can have greater control over their data, reduce the risk of unauthorized access, and ensure a more reliable and efficient communication infrastructure tailored to their specific needs. Private networks can be physical, involving on-premises hardware like servers and routers, or virtual, utilizing technologies such as Virtual Private Networks (VPNs) to create secure connections over public infrastructure. However, while private networks provide security for the devices and users assigned to the network, situations arise where resources within the private network should be made available to devices outside of the network. This availability requirement causes time consuming configuration updates to make the desired files, web content, and the like available to devices outside of the private network.

SUMMARY

The technology described herein manages access to private network resources from external devices via a relay computing element. In one implementation, a relay computer is configured to receive a first packet from a first computing element outside of a private network. The relay computer is further configured to a notification to a second computing element in the private network to determine whether the first packet is permitted and a response from the second computing element to the notification, wherein the response indicates that the first packet is permitted. When the response indicates that the first packet is permitted, the relay computer generates a second packet that includes the first packet in a payload of the second packet, wherein the second packet comprises a first private IP address associated with the relay computing element and a second private IP address associated with the second computing element. The relay computer further encapsulates the second packet in a third packet, wherein a header of the third packet comprises public addressing information to communicate the third packet over the Internet toward the second computing element. Once encapsulated, the relay computer communicates the third packet toward the second computing element.

BRIEF DESCRIPTION OF THE DRAWINGS

FIG. 2 illustrates an operation of a relay computing element to manage access to a private network resource according to an implementation.

DETAILED DESCRIPTION

Figure 1:
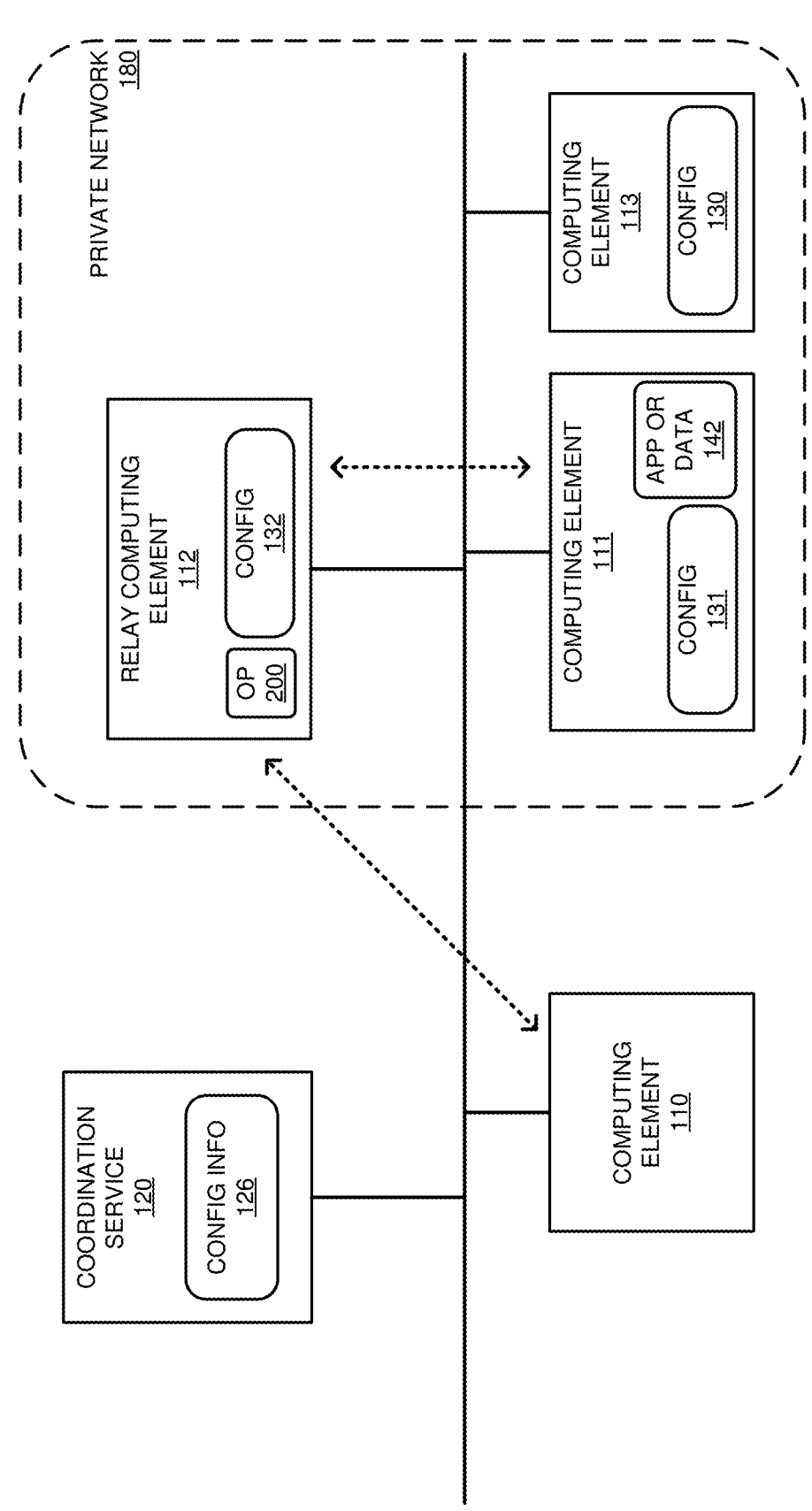
FIG. 1 illustrates a computing environment to manage access to private network resources via a relay computing element according to an implementation.

FIG. 1 illustrates a computing environment 100 to manage access to private network resources via a relay computing element according to an implementation. Computing environment 100 includes computing elements 110-113 and coordination service 120. Coordination service 120 comprises one or more physical computers that provide configuration information 126 to computing elements of a private network. Computing elements 111-113 further include configurations 130-132 that are used to support and manage private network packets in private network 180. Private network 180 indicates the computing elements visible to computing element 111 as part of a private network. Computing element 111 further includes application or data 142 that is made accessible to computing elements outside of the private network via relay computing element 112. Relay computing element 112 provides at least operation 200 that is described further below with respect to FIG. 2.

In computing environment 100, computing element 111 belongs to a private network 180 with computing elements 112-113. In some examples, computing elements 111-113 represent physical computers, such as servers or desktop computers. In other examples, computing elements 111-113 represent virtual endpoints, such as virtual machines or containers. To communicate in the private network, computing element 111 receives configuration information from coordination service 120. In at least one implementation, computing element 111 generates a request to coordination service 120 to join the private network. In response to the request, computing element 111 receives public addressing information for other computing elements available in the private network 180, private addressing information for other computing elements available in private network 180, and public encryption key information to communicate with other computing elements in private network 180. The public addressing information includes public IP (Internet Protocol) addresses associated with computing elements 112-113 (can be direct public IPs or IPs associated with a router/firewall for the computing element). The private addressing information includes private IP addresses allocated to computing elements 111-113 by coordination service 120. The public encryption key information includes public encryption keys generated by each computing element of computing elements 112-113.

In addition to receiving the communication information, computing element 111 further provides public encryption key information that is distributed to computing elements 112-113. Once the communication information is distributed, represented as configurations 130-132, computing element 111 can generate and communicate private network packets to other available computing elements. For example, when computing element 111 initiates a communication with computing element 113, a first packet is generated using the private addressing information provided as part of configuration 131 (i.e., private source and destination IP addresses). Once generated, the first packet is encapsulated in a second packet, wherein the first packet is encrypted using public encryption information for computing element 113 and the header of the second packet includes public addressing information for computing element 111 and computing element 113. After the second packet is generated, the packet is communicated to computing element 113. Computing element 113 decapsulates the packet using a private key local to computing element 113 and processes the first packet derived from the decapsulation.

Here, computing element 111 is made available to computing elements outside of private network 180 using relay computing element 112. Relay computing element 112 acts as a proxy that receives packets from external computing elements, determines whether the packet should be forwarded to computing element 111, and forwards the packet in a private network packet if the packet is permitted. In some implementations, an administrator or user associated with computing element indicates that one or more applications or data should be made available to external computing elements. The user or administrator specifies a domain, a server name identifier (SNI), a path, an available port, or some other information to reach the desired resource. In response to the indication, coordination service 120 configures relay computing element 112 to act as a proxy for computing element 111. If the administrator or user determines that the applications or data should no longer be available, coordination service 120 updates relay computing element 112 to no longer act as a relay, terminates the operation of relay computing element 112, or provides some other operation to remove the availability of relay computing element 112. In some examples, when computing element 111 generates the request for the relay, domain name systems (DNS) are updated to support the DNS requests from computing element 110 and other devices outside of the private network. Specifically, when a DNS request is initiated by computing element 110 with the URL for computing element 111, the DNS server provides the IP address for relay computing element 112. Thus, the requests are routed through a relay device rather than directly to computing element 111.

In at least one implementation, computing element 110 generates a transmission control protocol (TCP) packet that is communicated to relay computing element 112 using the public addressing information associated with relay computing element 112 (computing element 110 may be behind a firewall or router in some examples and may use its own IP address or the address of the router/firewall). Once received, relay computing element 112 determines whether computing element 111 is accepting packets from outside the private network and when packets are accepted, relays the communication to computing element 111. In relaying the packet, relay computing element 112 generates a second packet that includes the first packet in a payload of the second packet. Once generated, relay computing element 112 encapsulates the second packet in a third packet using the communication information from coordination service 120. In generating the second packet, relay computing element 112 uses a first private IP address for relay computing element 112 as a source IP address and a second private IP address for computing element 111 as the destination IP address. The private IP addresses are made available via coordination service 120. Additionally, when encapsulating the second packet in the third packet, relay computing element uses public IP addressing associated with computing element 111 to forward the third packet to computing element 111. The public IP address associated with computing element 111 may correspond to a router or some other device that can perform network address translation and forward the packet to computing element 111.

Once received at computing element 111, computing element 111 communicates a response to computing element 110, wherein the response is used to set up a Transport Layer Security (TLS) protocol communication between the computing elements. The response follows the same path (in reverse) as the initial communication from computing element 110. Specifically, computing element 111 generates a response that is placed in a payload of a second packet and encapsulated in a third packet. Computing element 111 communicates the third packet to relay computing element 112. Relay computing element 112 decapsulates the packet to obtain the second packet (the second packet includes the private addressing information as described above), extracts the response from the payload of the decapsulated private network packet, and forwards the response to computing element 110.

FIG. 2 illustrates an operation 200 of a relay computing element to manage access to a private network resource according to an implementation. The steps of operation 200 are referenced parenthetically in the paragraphs that follow with reference to systems and elements of computing environment 100 of FIG. 1.

Operation 200 provided by relay computing element 112 includes receiving (201) a first packet from a first computing element outside of a private network. In response to receiving the first packet, operation 200 further provides for determining (202) whether a second computing element in the private network permits the receipt of the first packet. In at least one implementation, relay computing element 112 provides a request to computing element 111 indicating unencrypted information about the first packet, such as server name identifier (SNI), port information, any available IP information (e.g., source IP address), or some other information. Computing element 111 uses the information to provide a response to relay computing element 112 to indicate whether the first packet is desired by computing element 111. The response is based at least in part on whether computing element 111 is still registered to receive packets from the relay or if computing element 111 has turned off the functionality. Additionally, the response can be based on access control lists that indicate permitted source IP addresses, permitted geographic regions, permitted ports, permitted SNIs, or some other factor that can correspond to an accept or deny determination. If computing element 111 indicates that the packet is not desired, then relay computing element 112 will block the packet.

In contrast, if computing element 111 indicates that the packet is permitted, operation 200 further generates (203) a second packet with the first packet in the payload of the second packet and private IP addressing associated with the relay and second computing element in a header of the second packet. The second packet is generated using the private addressing information provided from the coordination service that indicates at least the private IP addresses allocated to computing element 111-112. Once the second packet is generated, operation 200 further encapsulates (204) the second packet in a third packet, wherein a header of the third packet comprises public addressing information for forwarding the third packet over the Internet toward computing element 112. Unlike the private network addresses allocated by the coordination service, the public IP addresses permit packets to be routed over public Internet, while the payload is encrypted via the encryption key information provided for the computing elements in the private network.

As described herein, coordination service 120 distributes communication information to the computing elements in the private network, wherein the communication information includes public IP addressing for the computing elements, private IP addressing allocated by coordination service 120, and encryption key information to support communications in the private network. Relay computing element 112 uses the public IP address for relay computing element 112 as the source IP address in the header of the encapsulated packet and the public IP address associated with computing element 111 as the destination IP address in the header. After generating the third packet, operation 200 communicates (205) the third packet to the second computing element.

In some implementations, computing element 110 communicates a TCP packet to relay computing element 112. The TCP packet, once forwarded to computing element 111 is used to initiate a TLS protocol connection with computing element 111. Advantageously, relay computing element 112 is not capable of identifying data in the packet but merely provides a relay for the packets between computing elements 110-111. After receiving the third packet at computing element 111, computing element 111 generates a response packet that is communicated to relay computing element 112. The response packet is communicated in reverse to computing element 110, including using the private network information to relay computing element 111, permitting relay computing element 111 to forward the response once it is extracted from the private network packet to computing element 110.

Figure 3:
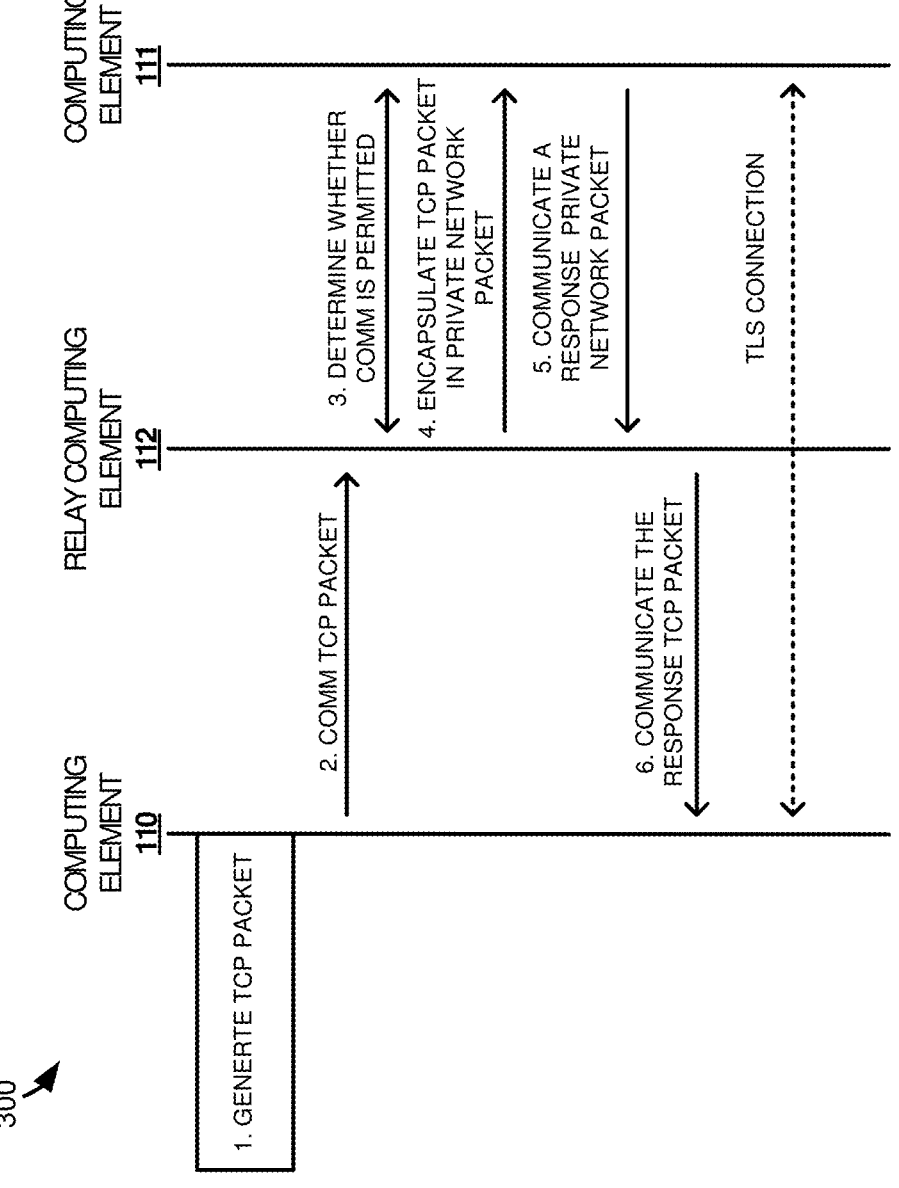
FIG. 3 illustrates a timing diagram of managing access to private network resources via a relay computing element according to an implementation.

FIG. 3 illustrates a timing diagram 300 of managing access to private network resources via a relay computing element according to an implementation. Timing diagram 300 includes computing elements 110-112 of FIG. 1.

In timing diagram 300, computing element 110 generates a TCP packet at step one and communicates the TCP packet to relay computing element 112 at step two. In some implementations, computing element 110 initiates a DNS request for the resource associated with computing element 111. In response to the request, the DNS server provides the IP address of relay computing element 112. Computing element 110 generates the TCP packet with the IP address for relay computing element 112 as the destination IP address and indicates an SNI in the header of the packet.

Once the packet is received by relay computing element 112, relay computing element 112 determines whether communication is permitted at step three. In some implementations, relay computing element 112 queries computing element 111 to determine whether the communication is permitted. The query can include the SNI identifier, port information of the packet, any unencrypted addressing information of the packet, or some other information for the packet. Computing element 111 provides an indication of whether the communication is permitted based on the provided information (e.g., the port and SNI are permitted). In some examples, computing element 111 is configured to receive packets from all public computers at a particular port (or not receive packets at the port). In other examples, computing element 111 is configured with an access control list that limits that devices that can communicate with computing element 111. The access control list limits the connections based on source IP, based on geolocation associated with the source IP, based on the SNI, or based on some other factor. The access is based on preferences of an administrator of the private network or the user of the computing element. The access control lists are enforced using the information provided by the relay computing element when a connection is requested.

If it is indicated that the packet is not permitted, relay computing element 112 blocks the packet. If it is determined that the packet is permitted, relay computing element 112 generates a second packet that includes the first packet in the payload and encapsulates the second packet in a third packet. Once encapsulated, relay computing element 112 communicates the third packet to computing element 111 at step four. Generating the second packet includes adding the first packet to the payload of the second packet and adding private addressing information to the header of the second packet. The private addressing information is assigned by the coordination service to the computing elements in the private network. Specifically, the source private IP corresponds to relay computing element 112 and the destination private IP corresponds to computing element 111. Relay computing element 112 encapsulates the second packet by encrypting the second packet in the payload of the third packet and adding public addressing information to the header of the third packet.

After the third packet is received by computing element 111, computing element 111 communicates a response as a private network packet to relay computing element 112 at step five. The response uses a private network packet, including private IP addresses for computing elements 111-112 and public IP addresses for computing elements 111-112. Specifically, the operations are performed in reverse from computing element 111 to relay computing element 112. Relay computing element 112 then identifies the response in the private network packet (decapsulation and extraction) and forwards the response to computing element 110. Once the response is delivered, relay computing element 112 acts as a transparent proxy between computing elements 110-111.

Figure 4:
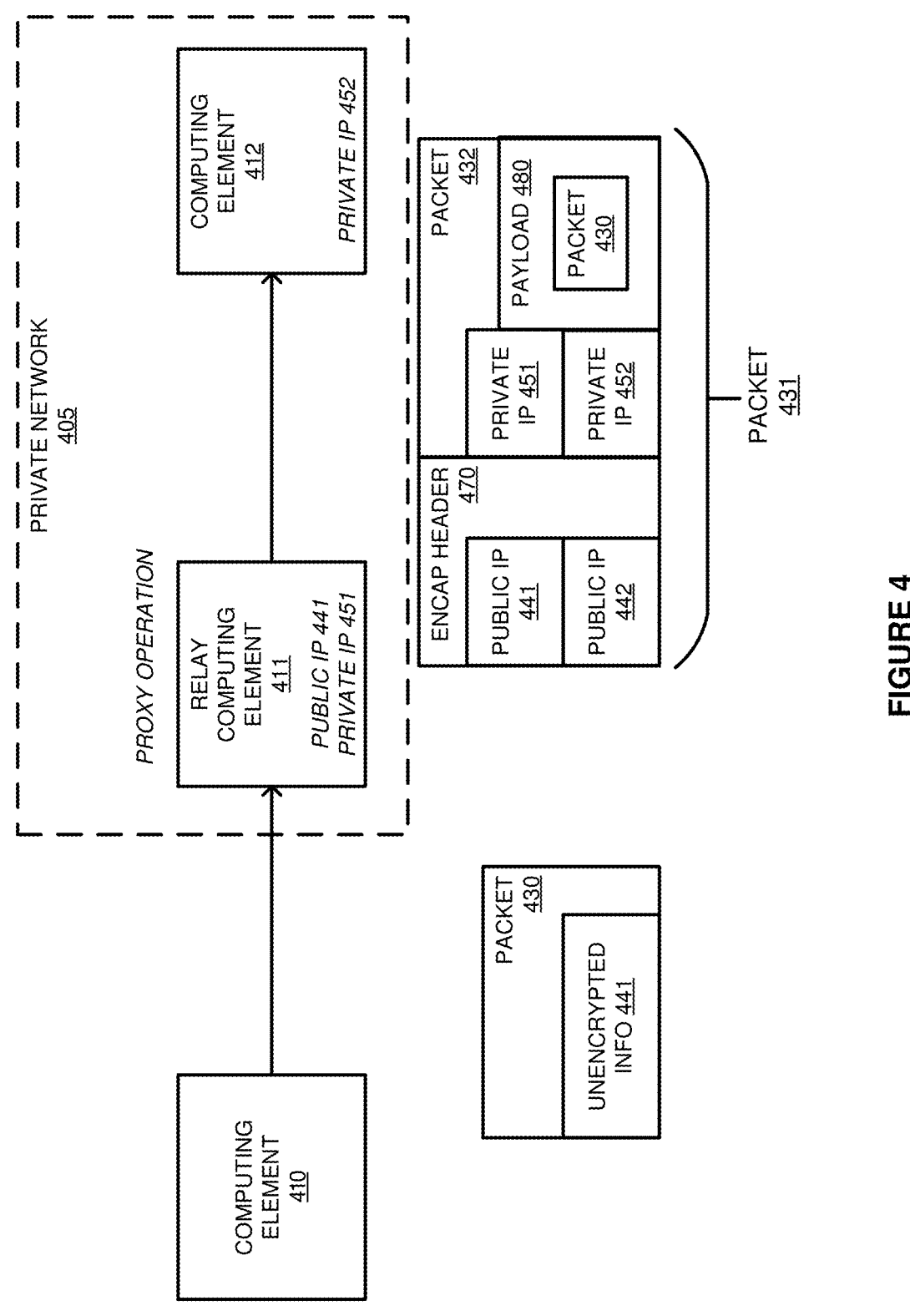
FIG. 4 illustrates an operational scenario of a packet flow over a relay computing element according to an implementation.

FIG. 4 illustrates an operational scenario 400 of a packet flow over a relay computing element according to an implementation. Operational scenario 400 includes computing elements 410-412 and packets 430-431. Relay computing element 411 uses public IP address 441 and private IP address 451, and computing element 412 uses private IP 452. The private IP addresses are allocated to computing elements 411-412 by a coordination service that distributes communication information to computing elements of a private network 405. Packet 430 includes unencrypted public IP address 441 and may include additional public information, such as SNI, port, IP, or some other unencrypted information. Packet 431 includes packet 432. Packet 431 further includes encapsulation header 470 with public IP address 441 and public IP 442 that are representative of the public source and destination IP addresses for the packet (public IP 442 is associated with computing element 412 and may represent a public IP for computing element 412, a router associated with computing element 412, or some other public endpoint to access computing element 412). Computing element 410-412 can represent physical computers or virtual endpoints, such as virtual machines or containers.

In operational scenario 400, computing element 410 generates packet 430 (a TCP packet with TLS) with unencrypted IP address 441 and additional public information (SNI, port, source IP, etc.). In forming packet, computing element 410 generates a DNS request that is answered with the public IP address for relay computing element 411. Relay computing element 411 is activated by a user or administrator of computing element 412 to provide a gateway for computing elements outside of the private network to request and receive information from computing element 412. The data can comprise a web service or web page, a data repository (i.e., folder), or some other resource. Rather than querying computing element 412 directly, relay computing element 411 can receive the communications and determine whether the packet should be forwarded to computing element 412. Advantageously, relay computing element 411 provides a buffer to hide the public IP address for computing element 412 and only forward packets that are desired by computing element 412.

Once packet 430 is generated and communicated to relay computing element 411, relay computing element 411 processes the packet to determine whether the packet is approved to be forwarded to computing element 412. In some implementations, relay computing element 411 provides a notification (as at least one new packet) to computing element 412 that indicates different attributes associated with packet 430. The attributes can comprise at least portions of unencrypted information included with public IP address 441 (e.g., port, SNI, IP if available, etc.). Based on the information, computing element 412 provides an indication of whether to accept the packet or block the packet. In some examples, computing element 412 is configured to accept all incoming packets (or block all incoming packets. In other examples, the user or administrator associated with computing element 412 limits that accessibility using access control lists. The access control lists limit the incoming packets based on the source IP address for the packet, the location of the incoming packet, or some other factor from the visible information.

Here, computing element 412 indicates that the packet is permitted. Relay computing element 411 generates packet 432 that includes packet 430 in payload 480 and private IP addresses 451-452. The private IP addresses are allocated by a coordination service and permit relay computing element 411 to act as a relay for computing systems outside the private network to access computing element 412. Once packet 432 is generated, relay computing element 411 further encapsulates packet 432 in packet 431. Specifically, to support the communication as part of the private network, relay computing element 411 first generates packet 432 with the private network address and encapsulates the packet using encryption key information provided for computing element 412. Relay computing element 411 further adds encapsulation header 470 which includes the required public addressing information to communicate the packet to computing element 412 (public IPs 441-442).

After packet 431 is communicated to computing element 412, computing element 412 decapsulates the packet using a locally maintained private encryption key and processes the packet. In some implementations, the packet from computing element 410 is used as part of a TLS setup process, wherein TLS provides a secure connection between computing element 410 and computing element 412.

Although demonstrated with a packet being communicated from computing element 410 to computing element 412, the operations are reversed when a packet is returned from computing element 412 to computing element 410. Specifically, the packet encapsulation operations are performed in reverse from computing element 412 to relay computing element 411 as a private network packet. Relay computing element 411 then forwards the response, once decapsulated and extracted from the private network packet, to computing element 410.

Figure 5:
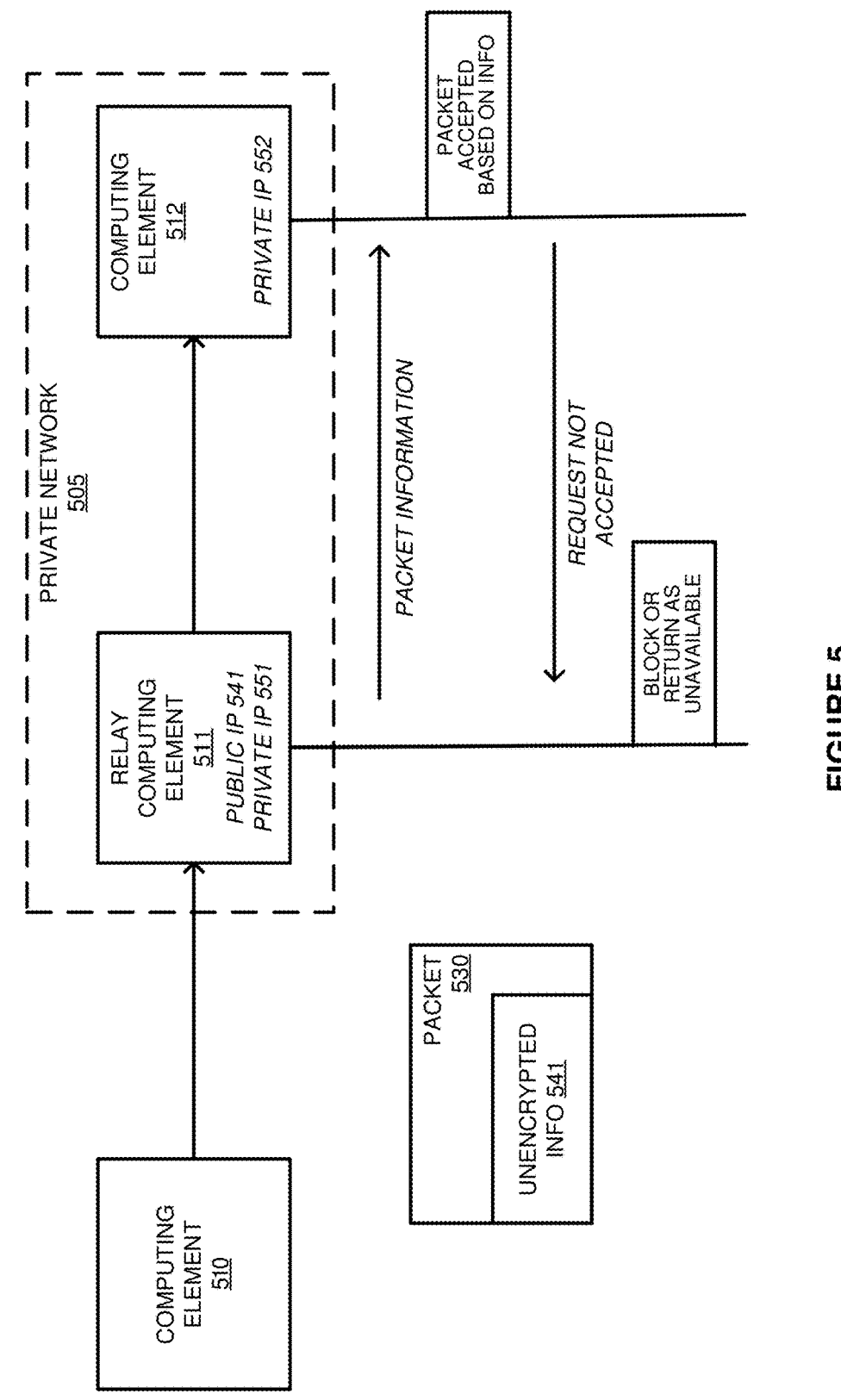
FIG. 5 illustrates an operational scenario of blocking a request from an external computing element according to an implementation.

FIG. 5 illustrates an operational scenario 500 of blocking a request from an external computing element according to an implementation. Operational scenario 500 includes computing elements 510-511 and packet 530. Relay computing element 511 uses public IP address 541 and private IP address 551, and computing element 512 uses private IP address 552. Packet 530 may also include unencrypted information in addition to public IP address 541, such as an SNI, destination port (e.g., port number), source IP address, or some other information based on protocol requirements.

In operational scenario 500, computing element 510 generates packet 530 with public IP address 541 and the unencrypted information above. In forming packet 530, computing element 510 generates a DNS request that is answered with the public IP address for relay computing element 511. Relay computing element 511 is activated by a user or administrator of computing element 512 to provide a gateway for computing elements outside of private network 505 to request and receive information from computing element 512. The data can comprise a web service or web page, a data repository (i.e., folder), or some other resource. Rather than querying computing element 512 directly, relay computing element 511 can receive the communications and determine whether the packet should be forwarded to computing element 512.

Here, relay computing element 511 provides packet information associated with packet 530 to computing element 512. The packet information includes at least a portion of the unencrypted information accompanying public IP address 541, such as the source IP address from packet 530, SNI from the packet, destination port, source IP address, and the like. In response to receiving the packet information, computing element 512 processes acceptance rules or access control lists to determine whether the packet is permitted. In some implementations, computing element 512 accepts all communications from external IP addresses and devices (or blocks all incoming connections). In other implementations, computing element 512 is configured to accept requests from a set of IP addresses or devices. For example, an administrator can generate an ACL that indicates a set of IP addresses approved to initiate a connection with computing element 512. In response to the notification from relay computing element 511, computing element 512 will compare the packet information to the ACL to determine whether the packet is permitted and provide a response indicating whether the packet is accepted.

In the example of operational scenario 500, computing element 512 provides an indication that the packet is not permitted. In response to the indication, relay computing element 511 blocks packet 530 from being forwarded to computing element 512. As a result, relay computing element 511 can stop incoming communications before they are received at computing element 512, increasing security associated with the resources at computing element 512.

Figure 6:
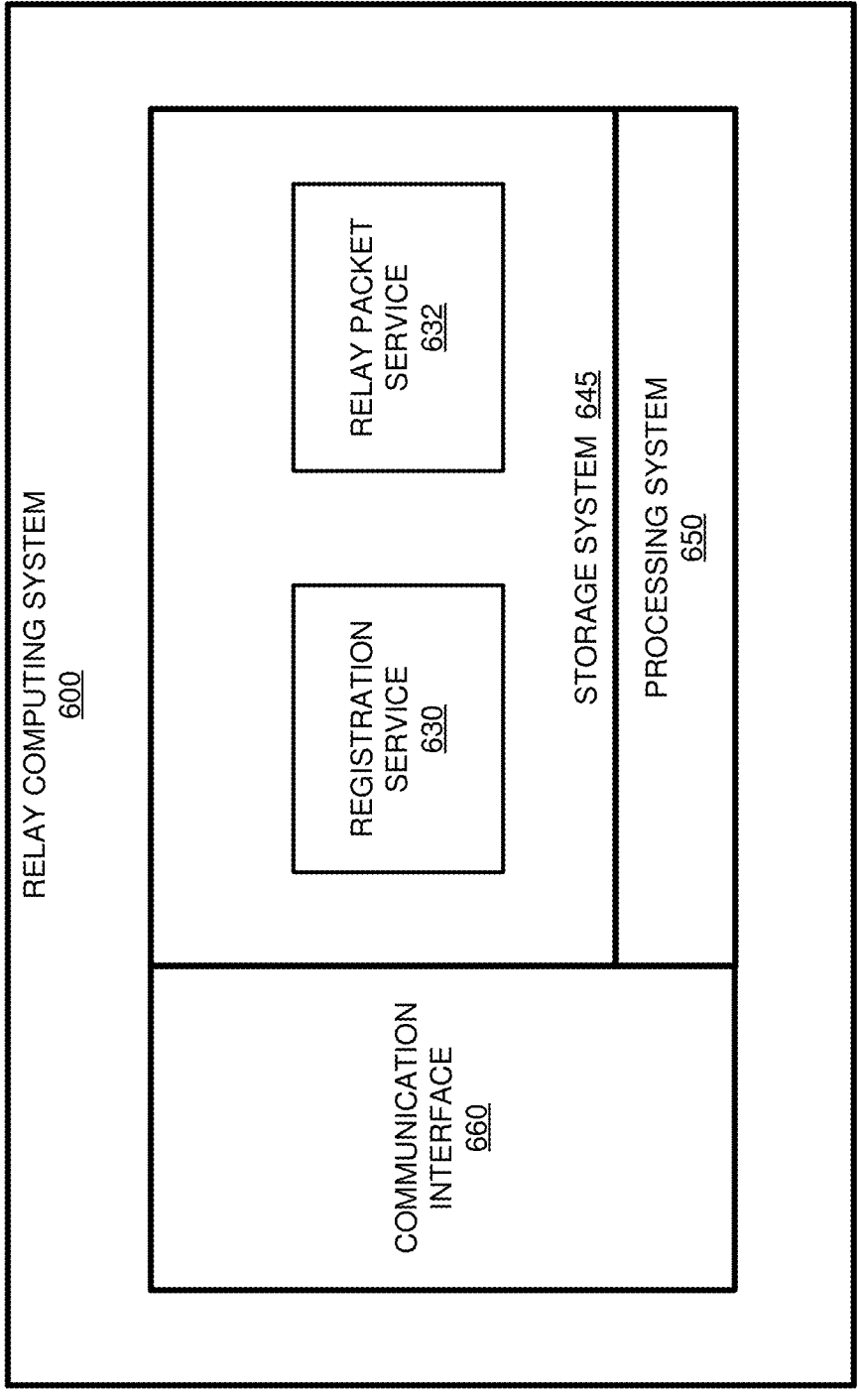
FIG. 6 illustrates a relay computing system to manage access to private network resources according to an implementation.

FIG. 6 illustrates a relay computing system 600 to manage access to private network resources according to an implementation. Computing system 600 is representative of any computing system or systems with which the various operational architectures, processes, scenarios, and sequences disclosed herein for a relay computing element can be implemented. Computing system 600 is an example of relay computing element 112 of FIG. 1, although other examples may exist. Computing system 600 includes storage system 645, processing system 650, and communication interface 660. Processing system 650 is operatively linked to communication interface 660 and storage system 645. Communication interface 660 may be communicatively linked to storage system 645 in some implementations. Computing system 600 may further include other components such as a battery and enclosure that are not shown for clarity.

Communication interface 660 comprises components that communicate over communication links, such as network cards, ports, radio frequency (RF), processing circuitry and software, or some other communication devices. Communication interface 660 may be configured to communicate over metallic, wireless, or optical links. Communication interface 660 may be configured to use Time Division Multiplex (TDM), Internet Protocol (IP), Ethernet, optical networking, wireless protocols, communication signaling, or some other communication format—including combinations thereof. Communication interface 660 may be configured to communicate with other computing systems (both physical and/or virtual) and a coordination service to obtain a configuration for computing system 600.

Processing system 650 comprises microprocessor (i.e., at least one processor) and other circuitry that retrieves and executes operating software from storage system 645. Storage system 645 may include volatile and nonvolatile, removable, and non-removable computer-readable storage media implemented in any method or technology for storage of information, such as computer readable instructions, data structures, program modules, or other data. Storage system 645 may be implemented as a single storage device but may also be implemented across multiple storage devices or sub-systems. Storage system 645 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case would a computer readable storage medium of storage system 645, or any other computer readable storage medium herein, be considered a transitory form of signal transmission (often referred to as "signals per se"), such as a propagating electrical or electromagnetic signal or carrier wave.

Processing system 650 is typically mounted on a circuit board that may also hold the storage system. The operating software of storage system 645 comprises computer programs, firmware, or some other form of machine-readable program instructions. The operating software of storage system 645 comprises registration service 630 and relay packet service 632. The operating software on storage system 645 may further include an operating system, utilities, drivers, network interfaces, applications, or some other type of software. When read and executed by processing system 650, the operating software on storage system 645 directs computing system 600 to operate as described herein as a relay computing element from FIGS. 1-5.

In at least one implementation, registration service 630 and relay packet service 632 direct processing system 650 to provide at least operation 200 of FIG. 2. Registration service 630 directs processing system 650 to obtain a configuration from the coordination service to act as a relay for communications outside a private network to a computing element in the private network. In some implementations, the computing element in the private network generates a request to create a relay, permitting computing elements outside the private network to access resources on the computing element. The resources can comprise files, web pages, or some other resource. In response to the request, a coordination service configures a relay computing element (a virtual machine in some examples) to act as a proxy and relay for packets to the computing element. The configuration includes public addressing information for the computing element, private addressing for the computing element, encryption information for the computing element, or some other communication information for the computing element.

Once configured, relay packet service 632 directs processing system 650 to receive a first packet from a first computing element outside of the private network and communicate a notification to the computing element in the private network to determine whether the first packet is permitted. In some examples, the notification includes information about the packet such as addressing (source IP), SNI, destination port, or some other unencrypted information in the packet. If the computing element in the private network determines that the first packet is not permitted, a notification is provided to computing system 600 and computing system 600 blocks the first packet and/or provides a notification to the requesting device that the destination server is unavailable. If the computing element in the private network indicates that the first packet is permitted, relay packet service 632 directs processing system 650 to generate a second packet that includes the first packet in a payload of the second packet, wherein the second packet comprises a first private IP address associated with the relay computing element and a second private IP address associated with the second computing element. Relay packet service 632 further directs processing system to encapsulate the second packet in a third packet, wherein a header of the third packet comprises public addressing information to communicate the third packet over the Internet toward the second computing element. Once encapsulated, the relay computing element forwards the third packet to the computing element in the private network.

The included descriptions and figures depict specific implementations to teach those skilled in the art how to make and use the best mode. For teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:
1. A method of operating a relay computing element comprising:

receiving a first packet, comprising an unencrypted Server Name Indication (SNI), from a first computing element outside of a private network;

communicating a notification, comprising at least the SNI and a destination port number from the first packet, to a second computing element in the private network to determine that the first packet is permitted;

receiving a response from the second computing element to the notification, wherein the response indicates that the first packet is permitted;

in response to the response indicating that the first packet is permitted, generating a second packet that includes the first packet in a payload of the second packet, wherein the second packet comprises a first private IP (Internet Protocol) address associated with the relay computing element and a second private IP address associated with the second computing element;

receiving encryption key information from a coordination service;

encapsulating the second packet in a third packet using the encryption key information, wherein a header of the third packet comprises public addressing information to communicate the third packet over the Internet toward the second computing element; and communicating the third packet toward the second computing element.

2. The method of claim 1, wherein the first packet comprises a transmission control protocol packet.

3. The method of claim 1, wherein the first packet uses transmission layer security (TLS) protocol.

4. The method of claim 1 further comprising:

receiving the first private IP address associated with the relay computing element from the coordination service, wherein the coordination service assigns the first private IP address to the relay computing element; and receiving the second private IP address associated with the second computing element from the coordination service, wherein the coordination service assigns the second private IP address to the second computing element.

5. The method of claim 1 further comprising:

receiving a fourth packet from a third computing element outside of the private network;

communicating a second notification to the second computing element in the private network to determine whether the fourth packet is permitted;

receiving a second response from the second computing element to the second notification, wherein the second response indicates that the fourth packet is not permitted; and blocking the fourth packet based on the second response.

6. A computing apparatus comprising:

a storage system;

a processing system, including at least one processor, operatively coupled to the storage system; and program instructions stored on the storage system to operate as a relay computing element that, when executed by the processing system, direct the computing apparatus to:

receive a first packet, comprising an unencrypted Server Name Indication SNI), from a first computing element outside of a private network;

communicate a notification, comprising at least the SNI and a destination port number from the first packet, to a second computing element in the private network to determine that the first packet is permitted;

receive a response from the second computing element to the notification, wherein the response indicates that the first packet is permitted;

in response to the response indicating that the first packet is permitted, generate a second packet that includes the first packet in a payload of the second packet, wherein the second packet comprises a first private IP (Internet Protocol) address associated with the relay computing element and a second private IP address associated with the second computing element;

receive encryption key information from a coordination service;

encapsulate the second packet in a third packet using the encryption key information, wherein a header of the third packet comprises public addressing information to communicate the third packet over the Internet toward the second computing element; and communicate the third packet toward the second computing element.

7. The computing apparatus of claim 6, wherein the first packet comprises a transmission control protocol packet.

8. The computing apparatus of claim 6, wherein the first packet uses transmission layer security (TLS) protocol.

9. The computing apparatus of claim 6, wherein the program instructions further direct the computing apparatus to:

receive the first private IP address associated with the relay computing element from the coordination service, wherein the coordination service assigns the first private IP address to the relay computing element; and receive the second private IP address associated with the second computing element from the coordination service, wherein the coordination service assigns the second private IP address to the second computing element.

10. The computing apparatus of claim 6, wherein the program instructions further direct the computing apparatus to:

receive a fourth packet from a third computing element outside of the private network;

communicate a second notification to the second computing element in the private network to determine whether the fourth packet is permitted;

receive a second response from the second computing element to the second notification, wherein the second response indicates that the fourth packet is not permitted; and block the fourth packet based on the second response.

11. A system comprising:

a first computer; and a relay computer, including at least one processor, configured to:

receive a first packet, comprising an unencrypted Server Name Indication (SNI), from a second computer outside of a private network;

communicate a notification, comprising at least the SNI and a destination port number from the first packet, to the first computer in the private network to determine whether the first packet is permitted;

receive a response from the computer to the notification, wherein the response indicates that the first packet is permitted;

in response to the response indicating that the first packet is permitted, generate a second packet that includes the first packet in a payload of the second packet, wherein the second packet comprises a first private IP (Internet Protocol) address associated with the relay computer and a second private IP address associated with the first computer;

receive encryption key information from a coordination service;

encapsulate the second packet in a third packet using the encryption key information, wherein a header of the third packet comprises public addressing information to communicate the third packet over the Internet toward the first computer; and communicate the third packet toward the first computer.

12. The system of claim 11, wherein the first packet comprises a transmission control protocol packet.

13. The system of claim 11, wherein the notification provides unencrypted information from the first packet, and wherein the first computer is further configured to:

determine whether the first packet is permitted based on an access control list maintained by the first computer and the unencrypted information from the first packet; and communicate the response based on the determination of whether the first packet is permitted.

\* \* \* \* \*